United States Patent
Seki

(10) Patent No.: US 8,050,861 B2
(45) Date of Patent: Nov. 1, 2011

(54) ROAD MAP

(76) Inventor: Kazuharu Seki, Tokyo (JP)

( * ) Notice: Subject to any disclaimer, the term of this patent is extended or adjusted under 35 U.S.C. 154(b) by 1039 days.

(21) Appl. No.: 11/017,293

(22) Filed: Dec. 20, 2004

(65) Prior Publication Data

US 2005/0143910 A1 Jun. 30, 2005

(30) Foreign Application Priority Data

Dec. 26, 2003 (JP) .................................. 2003-433928

(51) Int. Cl.
*G01C 21/30* (2006.01)
*G01C 21/32* (2006.01)
(52) U.S. Cl. .......... 701/208; 701/65; 701/201; 701/202; 701/209
(58) Field of Classification Search .................. 701/208, 701/65, 201, 202, 209; 340/995.1, 990, 995.27; 283/34, 35; 434/150
See application file for complete search history.

(56) References Cited

U.S. PATENT DOCUMENTS

| | | | | |
|---|---|---|---|---|
| 3,793,506 A | * | 2/1974 | Deschamps et al. | 382/113 |
| 3,936,667 A | * | 2/1976 | Loubal | 705/7.26 |
| 5,283,858 A | * | 2/1994 | Moellering et al. | 345/426 |
| 5,363,477 A | * | 11/1994 | Kuragano et al. | 345/426 |
| 5,450,343 A | * | 9/1995 | Yurimoto et al. | 701/208 |
| 5,506,779 A | * | 4/1996 | Kanki | 701/209 |
| 5,513,110 A | * | 4/1996 | Fujita et al. | 701/207 |
| 5,592,598 A | * | 1/1997 | Yamrom | 345/423 |
| 5,781,229 A | * | 7/1998 | Zediker et al. | 348/51 |
| 5,798,765 A | * | 8/1998 | Barclay | 345/426 |
| 5,884,218 A | * | 3/1999 | Nimura et al. | 701/208 |
| 6,157,342 A | * | 12/2000 | Okude et al. | 342/357.13 |
| 6,356,672 B1 | * | 3/2002 | Feng et al. | 382/312 |
| 2001/0028350 A1 | * | 10/2001 | Matsuoka et al. | 345/427 |

FOREIGN PATENT DOCUMENTS

JP 2003-131561 5/2003

OTHER PUBLICATIONS

The American Cartographer, 1986, vol. 13, No. 4, Table of Contents and pp. 324-333.*

* cited by examiner

*Primary Examiner* — Khoi Tran
*Assistant Examiner* — Jorge Peche
(74) *Attorney, Agent, or Firm* — Flynn, Thiel, Boutell & Tanis, P.C.

(57) ABSTRACT

A road map is provided which allows a determination to be intuitively rendered whether a course contains an increased number of upward slopes or downward slopes as viewed in the direction of the course. The direction of the course is set up across roads indicated on the map, and the upward slopes and the downward slopes located along the course are indicated in different colors. For example, the direction of the course is set up on the map by a starting point and destinations. A gentle upward slope is indicated by a red color of a low thickness, a medium upward slope is indicated by a red color of a medium thickness and a sharp upward slope is indicated by a red color of a high thickness. On the other hand, a gentle downward slope is indicated by a blue color of a low thickness, a medium downward slope is indicated by a blue color of a medium thickness and a sharp downward slope is indicated by a blue color of a high thickness. Accordingly, a determination as to whether the course contains an increased number of upward slopes or downward slopes can be intuitively made.

1 Claim, 2 Drawing Sheets

ROAD MAP

FIELD OF THE INVENTION

The present invention relates to road maps, and more particularly, to a road map with colored slopes for a variety of roads including national highways, prefectural roads, general roads, cycling roads, mountain climbing lanes and the like.

BACKGROUND OF THE INVENTION

Road maps are proposed in the art in which the magnitude and the direction of the gradient of a road are indicated on the map for a given interval measured along the length of the road to allow the presence of slopes and the degree of gradients to be readily recognized (see Japanese Laid-Open Patent Application No. 131,561/2003, for example).

In such a road map, a flat road (level terrain) is shown in blue, a slope with a medium gradient in yellow, and a slope with a sharp gradient in red, for example. This affords an advantage that an easy path can be chosen by following roads which are indicated in blue while avoiding roads indicated in red which represent a sharp gradient or upward slope.

However, it will be noted that in the road map mentioned above, the color is chosen in accordance with the magnitude of the gradient, for example, a sharp gradient is indicated in red independently from the direction in which a user desires to move, and therefore, the user has to determine whether the red indication represents an upward or a downward slope with respect to his intended course.

More specifically, when there are a number of downward slopes with sharp gradients when viewed in the direction of the course of a user, the individual downward slopes will be indicated in red. In this instance, the user can learn intuitively that there are a number of sharp slopes, but the user had to determine whether the sharp slope indicated in red represents a downward slope or an upward slope with respect to his course and to select an indicated road when it has a number of downward slopes. However, it is more troublesome to render such a determination when there are a number of slopes of different gradients (accordingly, indicated in different colors) in admixture.

SUMMARY OF THE INVENTION

In view of the foregoing, the present invention provides a road map which allows a determination to be rendered intuitively if there are many upward slopes or many downward slopes along the course.

Thus, the present invention is characterized in that a direction of the user's course is set up across roads which are indicated on a map and that an upward slope and a downward slope are indicated in different colors along the course.

With the described arrangement, since the course is set up across roads indicated on a map, it follows that for slopes having a gradient of an equal magnitude but in opposite directions, a portion representing an upward slope and a portion representing a downward slope as considered in the direction of the course will be indicated in different colors.

As a consequence, if an upward slope as considered in the direction of the course is indicated in red while a downward slope is indicated in blue, it is possible to recognize immediately whether the course includes an increased number of locations indicated in red or it includes an increased number of locations indicated in blue, facilitating a choice of the roads in comparison to the prior art.

Conversely, when the user desires to move in the opposite direction to the course which is once set up on the map, it is only necessary that the indications in red and in blue be understood in an opposite manner, again allowing the roads to be easily selected.

The above and other objects and advantages of the present invention will become apparent from the following description of an embodiment with reference to the drawings.

DETAILED DESCRIPTION OF THE EMBODIMENT

Figure 1:
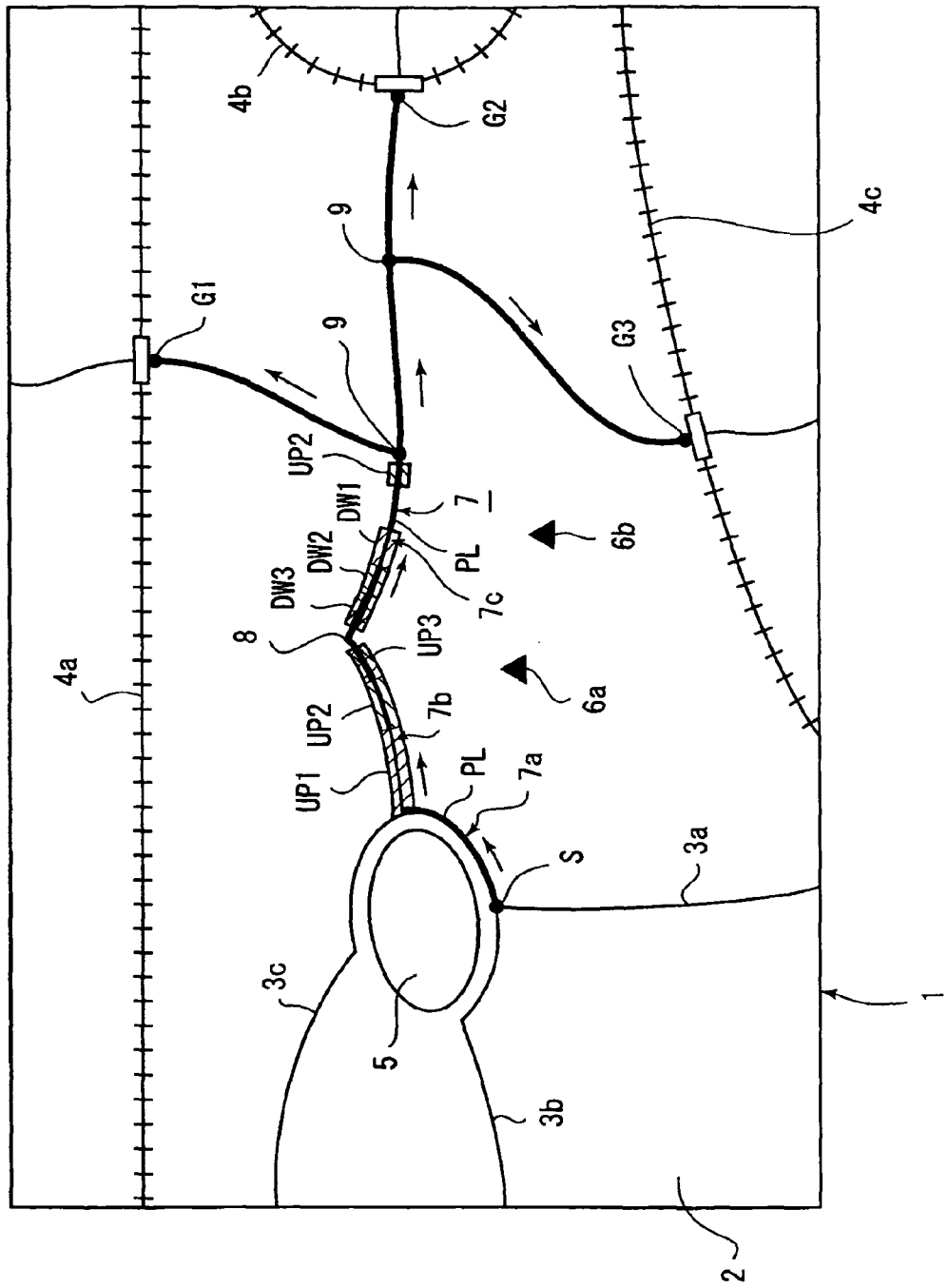
FIG. 1 is a plan view showing a road map.
Figure 2:
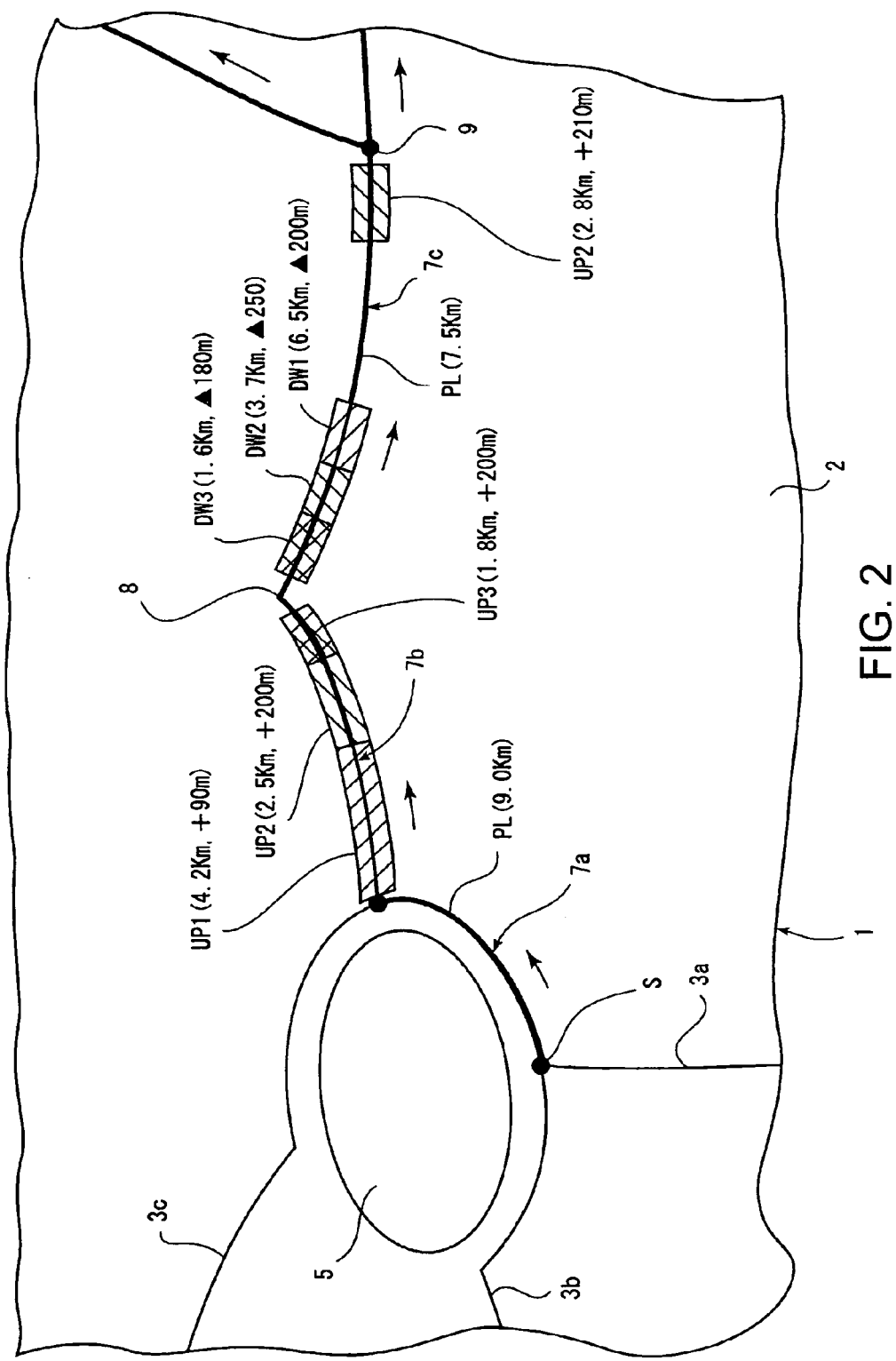
FIG. 2 is a plan view, to an enlarged scale, of an essential part shown in FIG. 1.

Describing an embodiment of the present invention shown in the drawings, in FIG. 1, a road map 1 is printed on a sheet of paper 2 to be indicated. A fundamental manner of indicating the road map 1 has no distinction from a conventional road map, and a road map contains a number of roads 3a, 3b, . . . , a number of railways 4a, 4b, 4c, a lake 5, and hill tops 6a, 6b and the like, which are indicated in the same manner as displayed on a conventional road map.

In the present embodiment, a cycling course 7 which utilizes the general roads 3a, 3b, . . . , is set up on the road map 1, and includes one starting point S and three destinations G1, G2, and G3.

In the embodiment shown, the cycling course 7 (7a, 7b, . . . ) is indicated in thick lines in order to allow it to be distinguished from other general roads 3a, 3b, . . . which are shown on the road map 1, but any method other than using the thick lines may be used if it allows the course to be discriminated from other roads. The course is set up on the roads on which the cycling course 7 is designated in a direction starting from the starting point S and progressing toward the destinations G1, G2 and G3.

The starting point S is chosen as a bus terminal located alongside the lake 5 in the embodiment shown, permitting a user of the road map 1 to take a bus for carrying his bicycle to the starting point S. On the other hand, the destinations G1, G2 and G3 represent stations of different railways 4a, 4b and 4c in the embodiment shown. In this manner, the user of the road map 1 can start the cycling from the starting point S to run a selected one of the cycling courses 7 to reach either one of the destinations G1, G2, G3, whereupon he can go home by utilizing one of the railways 4a, 4b, 4c.

The cycling course 7 is indicated in different colors for an upward slope having an upward gradient and a downward slope having a downward gradient as viewed in the direction of the course.

The gradient can be determined on the basis of a difference in the elevation per 100 m, for example. A difference in elevation which is less than 2 m can be categorized as a flat road, a difference in elevation which is between 2 and 6 m may be categorized as a gentle gradient (either a gentle upward or downward slope), a difference in elevation which is between 6 and 10 m can be categorized as a medium gradient (either an upward or a downward medium slope) and a difference in elevation which is equal to or greater than 10 m can be categorized as a sharp gradient (either an upward or a downward sharp slope).

The coloring takes place, for example, by leaving the flat road without any color while representing a gentle upward slope by a red color of a low thickness, a medium upward slope by a red color of a medium thickness and representing a sharp upward slope by a red color of a high thickness. A gentle downward slope is represented by a blue color of a low thickness, a medium downward slope by a blue color of a medium thickness and a sharp downward slope by a blue color of a high thickness.

Instead of representing the magnitude of the gradient by the thickness of a given color, the gradient may also be represented by colors which belong to a similar color system. By way of example, upward slopes can be represented by a pink, an orange and a red color which belong to a warm color system in an ascending order of the gradient. On the other hand, downward slopes can be represented by a yellow-green color, a green color and a blue color which belong to a cold color system in an ascending order of the gradient. It will be understood that this type of sorting by colors can be utilized concurrently with the use of different thicknesses of a single color.

Considering the cycling course 7 from the starting point S more closely, it will be seen that a course segment 7a which extends along the lake side is shown by a thick line, but is not colored since the gradient of the course segment 7a corresponds to a flat road PL or assumes the same color as the general road. Only the distance of the flat road PL is indicated.

A course segment 7b which follows the course segment 7a represents a mountain pass having an upward gradient which extends away from the lake side, and the gradient increases gradually beginning with a gentle upward slope UP1, followed by a medium upward slope UP2 and a sharp upward slope UP3 located short of a ridge 8.

Accordingly, slopes which are indicated by a red color of a low thickness, a red color of a medium thickness and a red color of a high thickness are sequentially shown in the sequence named to represent the course segment 7b. A user will be able to understand at a glance that the upward slope starts at a location short of the ridge 8 and that the upward gradient increases gradually as the ridge 8 is approached. The distance and the difference in elevation are indicated for each of the upward slopes UP1, UP2 and UP3.

In a course segment 7c which extends beyond the ridge 8, a sharp downward slope DW3 begins immediately after the ridge 8 has been passed, and is followed by a medium downward slope DW2 and a gentle downward slope DW1 which have gradually decreasing gradients to reach a flat road PL. Subsequently, a medium upward slope UP2 appears at a location short of a branch point 9.

Accordingly, the course segment 7c contains regions of a blue color of a high thickness, a blue color of a medium thickness and a blue color of a low thickness, an uncolored region and a region of a red color of a medium thickness in the sequence named, and a user can understand at a glance that a downward slope begins when the ridge 8 is passed, that the downward gradient becomes increasingly gentle as further removed from the ridge, and that an upward slope of a medium gradient follows a flat road. Each of the down slopes DW3, DW2 and DW1 and the upward slope UP2 is provided with an indication of a distance and a difference in elevation, and the flat road PL is provided with an indication of a distance alone.

Other segments of the cycling course is provided with several indications as mentioned above depending on the gradients, and accordingly, a user can easily select a course with many red indications or a course with many blue indications, considering his physical conditions at each branch point 9.

In the embodiment described above, the gradient of the upward slope and the gradient of the downward slope are chosen to be of an equal level. However, in the practice of cycling, the gradient of an upward slope has a greater significance than the gradient of a downward slope. In consideration of this, a finer sorting of the gradient such as using four or more colors may be used for an upward slope while a single indication may be used for the downward slopes DW3, DW2 and DW1.

In the described embodiment, a cycling course which utilizes the general roads has been described, but the invention is not limited thereto, but is also applicable to a devoted cycling course or to a mountain climbing lane.

In particular, for a mountain climbing lane, it is desirable that the direction of a course be determined choosing a crest as destination and choosing each inlet of ascent for a plurality of climbing courses at a starting point. Once chosen, it is readily possible to determine at a glance which climbing is an easy course.

In addition, although the embodiment has been described with reference to the road map 1 indicated on the sheet of paper 2, it should be understood that the road map may be one displayed on an automobile navigator, a cycling navigator, a climbing navigator or a monitor used on a controller such as a personal computer.

It will be seen that when such a controller is used, a road map of a required extent can normally be displayed on the monitor, and the direction of the course can be set up on the course thereon. Accordingly, it is evident that if data relating to the gradients along the road are stored in the controller, the road map having a content which is equivalent to what has been described above can be displayed on the monitor.

The direction of the course can be determined by designating a starting point and a destination on a map displayed on the monitor. By specifying one or more stop-by points, it is possible to establish a route to one's preference.

The condition for sorting a coloring in accordance with the magnitude of the gradient (parameter) can be freely set up in accordance with the preference of the user. For example, in the example given above, a difference in elevation which is 10 m or greater per 100 m is chosen as a sharp gradient, but a difference in elevation which is equal to or greater than 20 m can be set up as a sharp gradient.

In a navigator which is provided with GPS, a current position can be displayed on the monitor of the navigator and accordingly, one or more routes and a direction of the course can be set up by specifying a destination. In this instance, if a plurality of routes are displayed, the user can easily discriminate the frequency and degree of the upward slopes or downward slopes on the basis of differences of colors of individual courses, and accordingly, the user can easily select a preferred course.

While the invention has been described above with reference to an embodiment thereof, it should be understood that a number of changes, substitutions and modifications therein are possible without departing from the spirit and scope of the invention, and it is to be understood that the scope of the invention is solely determined from the appended claims.

What is claimed is:

1. A road map in which a direction of travel along a predetermined course from one or more starting points to one or more destinations is specifically indicated and upward slopes along the direction of travel are indicated by a different color than downward slopes along the direction of travel,
  wherein two or more colors are used for the each of the upward slopes and the downward slopes,
  wherein a first color is used for a slope having a difference in elevation between two and six meters, a second color is used for a slope having a difference in elevation between six and ten meters and a third color is used for a slope having a difference in elevation exceeding ten meters, the elevation differences being per 100 meters.

* * * * *